: (12) United States Patent
Heavner

(10) Patent No.: US 8,452,459 B2
(45) Date of Patent: May 28, 2013

(54) HEAT EXCHANGE NETWORK HEAT RECOVERY OPTIMIZATION IN A PROCESS PLANT

(75) Inventor: Louis W. Heavner, Austin, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 498 days.

(21) Appl. No.: 12/551,130

(22) Filed: Aug. 31, 2009

(65) Prior Publication Data

US 2011/0054703 A1 Mar. 3, 2011

(51) Int. Cl.
*G05D 23/19* (2006.01)
*G05D 7/06* (2006.01)

(52) U.S. Cl.
USPC .......................................... 700/282; 700/300

(58) Field of Classification Search
USPC ...................... 700/282, 300; 62/177, 178, 209
See application file for complete search history.

(56) References Cited

U.S. PATENT DOCUMENTS

| | | | | |
|---|---|---|---|---|
| 5,724,924 A * | 3/1998 | Michels | ...................... | 123/41.12 |
| 6,443,335 B1 * | 9/2002 | Pinedjian et al. | .............. | 222/504 |
| 6,711,909 B2 * | 3/2004 | Moon et al. | ....................... | 62/184 |
| 6,732,540 B2 * | 5/2004 | Sugihara et al. | ................. | 62/177 |
| 6,755,038 B2 * | 6/2004 | Hwang | ............................ | 62/184 |
| 6,860,349 B2 * | 3/2005 | Ogawa et al. | ..................... | 165/41 |
| 6,948,328 B2 * | 9/2005 | Kidwell | ............................ | 62/209 |
| 7,178,351 B2 * | 2/2007 | Varney | .............................. | 62/178 |
| 7,254,955 B2 * | 8/2007 | Otake et al. | ................... | 62/238.7 |
| 7,578,138 B2 * | 8/2009 | Varney | .............................. | 62/178 |
| 7,946,120 B2 * | 5/2011 | Bell et al. | .......................... | 62/3.7 |
| 8,087,258 B2 * | 1/2012 | Toyoshima et al. | .............. | 62/129 |
| 8,109,105 B2 * | 2/2012 | Unezaki et al. | .................. | 62/149 |
| 2003/0084673 A1 * | 5/2003 | Moon et al. | ...................... | 62/184 |
| 2003/0230100 A1 * | 12/2003 | Hwang | ............................ | 62/184 |
| 2004/0112037 A1 * | 6/2004 | Yagi et al. | ........................ | 60/39.3 |
| 2004/0112584 A1 * | 6/2004 | Weng | ............................. | 165/299 |
| 2004/0210283 A1 | 10/2004 | Rose et al. | | |
| 2006/0107683 A1 * | 5/2006 | Song et al. | ................... | 62/324.1 |
| 2006/0185376 A1 * | 8/2006 | Yoshimi et al. | .............. | 62/228.1 |
| 2007/0000660 A1 * | 1/2007 | Seerup et al. | ................. | 165/296 |
| 2008/0245083 A1 * | 10/2008 | Tutunoglu et al. | .............. | 62/115 |
| 2008/0245398 A1 * | 10/2008 | Bell et al. | ....................... | 136/224 |
| 2009/0013700 A1 * | 1/2009 | Unezaki et al. | ................... | 62/77 |
| 2009/0266093 A1 * | 10/2009 | Aoki | .............................. | 62/155 |

OTHER PUBLICATIONS

Cho at al., "Applying Energy Management in Pulp and Paper Mills," *Tappi*, 63(6):325-335 (1980).
Nelder et al., "A Simplex Method for Function Minimization," *Computer Journal*, 7:308-313 (1955).
Search Report for Application No. GB1014261.0, dated Nov. 30, 2010.

* cited by examiner

*Primary Examiner* — Charles Kasenge
(74) *Attorney, Agent, or Firm* — Marshall, Gerstein & Borun LLP

(57) ABSTRACT

A method and system for maximizing heat recovery in a heat exchange network includes collecting on-line process data from a network of heat exchangers having multiple parallel paths. The on-line process data is generated from cool process stream outlet temperatures of the paths. Stream flow rate target values are developed based on the on-line process data and include intended flow rates through each heat exchanger to equalize each of the cool process stream outlet temperatures. One or more cool stream flow control valves of the heat exchanger network and one or more process stream flow control valves of the heat exchanger network are controlled based on the flow rate target values to effect equalization of the cool process stream outlet temperatures.

24 Claims, 9 Drawing Sheets

HEAT EXCHANGE NETWORK HEAT RECOVERY OPTIMIZATION IN A PROCESS PLANT

BACKGROUND

1. Field of the Disclosure

The disclosure generally relates to process control systems and specifically to heat recovery maximizers for oil refineries having multiple parallel heat exchangers.

2. Related Technology

Process control systems, like those used in chemical, petroleum or other processes, typically include one or more centralized or decentralized process controllers communicatively coupled to at least one host or operator workstation. The process controllers are also typically coupled to process control and instrumentation devices such as, for example, field devices, via analog, digital or combined analog/digital buses. Field devices, which may be valves, valve positioners, switches, transmitters, and sensors (e.g., temperature, pressure, and flow rate sensors), are located within the process plant environment and perform functions within the process such as opening or closing valves, measuring process parameters, increasing or decreasing fluid flow, etc. Smart field devices such as field devices conforming to the well-known FOUNDATION™ Fieldbus (hereinafter "Fieldbus") protocol or the Highway Addressable Remote Transmitter (HART®) protocol may also perform control calculations, alarming functions, and other control functions commonly implemented within the process controller.

The process controllers, which are typically located within the process plant environment, receive signals indicative of process measurements or process variables made by or associated with the field devices and/or other information pertaining to the field devices, and execute controller applications. The controller applications implement, for example, different control modules that make process control decisions, generate control signals based on the received information, and coordinate with the control modules or blocks being performed in the field devices such as HART® and Fieldbus field devices. The control modules in the process controllers send the control signals over the communication lines or signal paths to the field devices to thereby control the operation of the process.

Information from the field devices and the process controllers is typically made available to one or more other hardware devices such as operator workstations, maintenance workstations, personal computers, handheld devices, data historians, report generators, centralized databases, etc., to enable an operator or a maintenance person to perform desired functions with respect to the process such as, for example, changing settings of the process control routine, modifying the operation of the control modules within the process controllers or the smart field devices, viewing the current state of the process or of particular devices within the process plant, viewing alarms generated by field devices and process controllers, simulating the operation of the process for the purpose of training personnel or testing the process control software, and diagnosing problems or hardware failures within the process plant.

While a typical process plant has many process control and instrumentation devices such as valves, transmitters, sensors, etc. connected to one or more process controllers, there are many other supporting devices that are also necessary for or related to process operation. These additional devices include, for example, power supply equipment, power generation and distribution equipment, rotating equipment such as turbines, motors, etc., which are located at numerous places in a typical plant. While this additional equipment does not necessarily create or use process variables and, in many instances, is not controlled or even coupled to a process controller for the purpose of affecting the process operation, this equipment is nevertheless important to, and ultimately necessary for proper operation of the process.

Process control of energy management is a vital concern throughout the oil refinery industry, as well as other process systems. Typical oil refineries include some sort of distillation system. In the distillation system, crude oil is transported to a heater which heats the crude oil prior to distillation. As a result, crude oil refineries require large energy inputs as the crude oil is heated before being distilled. Heating the crude oil is necessary because hot crude oil separates more easily into its distilled components. Moreover, heating the crude oil increases efficiency and reduces fuel consumption of many refining processes. Because the crude oil is heated, the distilled products contain sensible heat from the distillation process. Sensible heat is the heat transferred to or from the product stream when there is a temperature change (either an increase or decrease) in the stream. This sensible heat is potentially reclaimable energy that, if reclaimed and reused, could boost the efficiency of the distillation process. Thus, most oil refineries include some sort of a heat recovery system, for example heat exchangers. Heat exchangers transfer some of the sensible heat from the distilled products to the crude oil stream prior to distillation. In doing so, the heat exchanger reduces the amount of fuel needed to preheat the crude oil to a predetermined temperature.

Due to the size and complexity of most modern oil refineries, a single heat exchanger is not sufficient to accomplish full preheating of the crude oil. Thus, most modern oil refineries include a network of heat exchangers that heat different streams of crude oil. These networks of heat exchangers, however, do not maximize or optimize heat recovery from the distilled products, because over time the heat exchangers operate at different levels of heat transfer efficiency due to the buildup of fouling fluids on heat exchange surfaces.

Moreover, most modern oil refineries process varying qualities of crude oil and have varying demands for the refined products. The buildup of fouling fluids, varying quality of crude oil, and varying demand for refined products all lower the efficiency of known heat exchanger systems. Alternatively, the heat exchangers may use hot process fluid streams that must be cooled, as part of a secondary process, to preheat the crude oil thus further increasing efficiency. Some process design technologies are used to specify the heat exchangers that will maximize heat recover in accordance with the refinery design criteria. After the refinery is built, the process control system must generally optimize the refinery performance within given design and economic constraints. In some cases, the crude feed heat recovery optimizer must be able to maximize heat recover for a specified crude charge rate under varying conditions. The economics of the optimizer must often be reasonable, because many refineries are relatively small and may not be able to justify a large number of instruments and control valves. In addition, given the variety of process control systems among various refineries, the optimizer should be easy to implement.

Many process plants, such as oil refineries, include equipment monitoring and diagnostic applications such as, for example, the Machinery Health® application provided by CSI Systems, or any other known applications used to monitor, diagnose, and optimize the operating state of various rotating equipment. Maintenance personnel usually use these applications to maintain and oversee the performance of rotating equipment in the plant, to determine problems with the rotating equipment, and to determine when and if the rotating equipment must be repaired or replaced. Similarly, many process plants include power control and diagnostic applications such as those provided by, for example, the Liebert and ASCO companies, to control and maintain the power generation and distribution equipment. It is also known to run control optimization applications such as, for example, real-time optimizers (RTO+), within a process plant to optimize the control activities of the process plant. Such optimization applications typically use complex algorithms and/or models of the process plant to predict how inputs may be changed to optimize operation of the process plant with respect to some desired optimization variable such as, for example, profit.

Most known heat exchange optimizer systems use a search routine to find an optimum blended temperature after the crude streams are rejoined. With known systems, small changes in the efficiency of one heat exchanger may not result in a large change in the blended temperature and thus, known systems cannot account for these small changes in efficiency. However, small changes in efficiency may lead to large losses over time.

These and other diagnostic and optimization applications are typically implemented on a system-wide basis in one or more of the operator or maintenance workstations, and may provide preconfigured displays to the operator or maintenance personnel regarding the operating state of the process plant, or the devices and equipment within the process plant. Typical displays include alarming displays that receive alarms generated by the process controllers or other devices within the process plant, control displays indicating the operating state of the process controllers and other devices within the process plant, maintenance displays indicating the operating state of the devices within the process plant, etc. Likewise, these and other diagnostic applications may enable an operator or a maintenance person to retune a control loop or to reset other control parameters, to run a test on one or more field devices to determine the current status of those field devices, or to calibrate field devices or other equipment.

SUMMARY

A system and method to facilitate heat recovery in a process control system is disclosed with a specific premise of maximizing heat recovery in a heat exchanger network. In particular, only the outlet temperature need be collected from each heat exchanger path. The system and method accomplishes the maximization through load allocation, known as Incremental Cost Equalization (ICE). ICE works on the notion that if the incremental costs are not equal, then the load should be shifted from the unit (path) with the higher incremental cost to the unit (path) with the lower incremental cost. As such, the load is shifted from a higher incremental cost (i.e., less efficient) heat exchanger path to a lower incremental cost (i.e., more efficient) heat exchanger path. The disclosed technique is derived from an explicit expression or model for calculating efficiency as a function of load. The equation takes into account the difference in the inlet and outlet temperatures of each heat exchanger path and the heat capacities of the heat exchanger(s) in the path. Because the heat capacities and inlet temperatures are generally the same for each parallel path, only the outlet temperatures need to be equalized in order to maximize the heat recovery. Based on the outlet temperatures, flow rate targets may be calculated and for each heat exchanger to equalize the outlet temperatures, and control may be effected to achieve the target flow rates, thereby equalizing the outlet temperatures and maximizing heat recovery in the heat exchanger network.

DETAILED DESCRIPTION

Disclosed herein are a process control system architecture and method that implement a technique for optimizing heat recovery in a network of heat exchangers.

Figure 1:
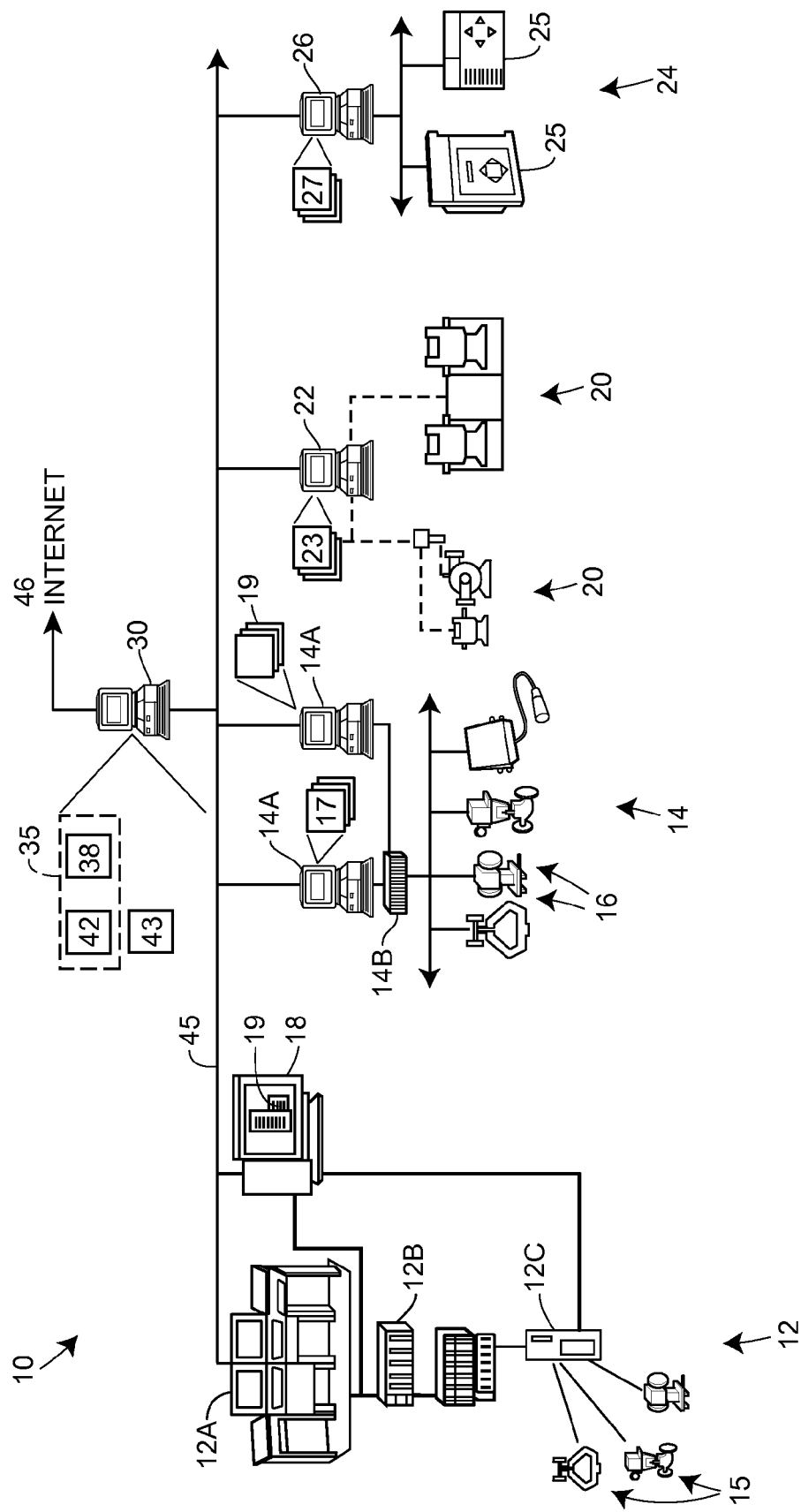
FIG. 1 is an exemplary block diagram of a process plant having a distributed process control system and network including one or more operator and maintenance workstations, controllers, field devices and supporting equipment.

Referring now to FIG. 1, an exemplary process plant 10 in which a heat recovery maximizing system may be implemented includes a number of control and maintenance systems interconnected together with supporting equipment via one or more communication networks. The process control system 12 may be a traditional process control system such as a PROVOX or RS3 system or any other control system which includes an operator interface 12A coupled to a controller 12B and to input/output (I/O) cards 12C, that, in turn, are coupled to various field devices such as analog and HART® field devices 15. The process control system 14, which may be a distributed process control system, includes one or more operator interfaces 14A coupled to one or more distributed controllers 14B via a bus, such as an Ethernet bus. The controllers 14B may be, for example, DeltaV™ controllers sold by Emerson Process Management of Austin, Tex. or any other desired type of controllers. The controllers 14B are connected via I/O devices to one or more field devices 16, such as for example, HART® or Fieldbus field devices or any other smart or non-smart field devices including, for example, those that use any of the PROFIBUS®, WORLDFIP®, Device-Net®, AS-Interface and CAN protocols. As is known, the field devices 16 may provide analog or digital information to the controllers 14B related to process variables as well as to other device information. The operator interfaces 14A may store and execute tools 17, 19 available to the process control operator for controlling the operation of the process including, for example, control optimizers, diagnostic experts, neural networks, tuners, etc.

Still further, maintenance systems, such as computers executing the AMS™ Suite: Intelligent Device Manager application described above and/or the monitoring, diagnostics and communication applications described below may be connected to the process control systems 12 and 14 or to the individual devices therein to perform maintenance, monitoring, and diagnostics activities. For example, a maintenance computer 18 may be connected to the controller 12B and/or to the devices 15 via any desired communication lines or networks (including wireless or handheld device networks) to communicate with and, in some instances, reconfigure or perform other maintenance activities on the devices 15. Similarly, maintenance applications such as the AMS™ Suite: Intelligent Device Manager application may be installed in and executed by one or more of the user interfaces 14A associated with the distributed process control system 14 to perform maintenance and monitoring functions, including data collection related to the operating status of the devices 16.

The process plant 10 also includes various rotating equipment 20, such as turbines, motors, etc. which are connected to a maintenance computer 22 via some permanent or temporary communication link (such as a bus, a wireless communication system or hand held devices which are connected to the equipment 20 to take readings and are then removed). The maintenance computer 22 may store and execute any number of monitoring and diagnostic applications 23, including commercially available applications, such as those provided by CSI (an Emerson Process Management Company), as well the applications, modules, and tools described below, to diagnose, monitor and optimize the operating state of the rotating equipment 20 and other equipment in the plant. Maintenance personnel usually use the applications 23 to maintain and oversee the performance of equipment 20 in the plant 10, to determine problems with the rotating equipment 20 and to determine when and if the equipment 20 must be repaired or replaced. In some cases, outside consultants or service organizations may temporarily acquire or measure data pertaining to the rotating equipment 20 and use this data to perform analyses for the rotating equipment 20 to detect problems, poor performance, or other issues effecting the rotating equipment 20. In these cases, the computers running the analyses may not be connected to the rest of the system 10 via any communication line or may be connected only temporarily.

Similarly, a power generation and distribution system 24 having power generating and distribution equipment 25 associated with the plant 10 is connected via, for example, a bus, to another computer 26 which runs and oversees the operation of the power generating and distribution equipment 25 within the plant 10. The computer 26 may execute known power control and diagnostics applications 27 such as those provided by, for example, Liebert and ASCO or other companies to control and maintain the power generation and distribution equipment 25. Again, in many cases, outside consultants or service organizations may use service applications that temporarily acquire or measure data pertaining to the equipment 25 and use this data to perform analyses for the equipment 25 to detect problems, poor performance, or other issues effecting the equipment 25. In these cases, the computers (such as the computer 26) running the analyses may not be connected to the rest of the system 10 via any communication line or may be connected only temporarily.

As illustrated in FIG. 1, a computer system 30 may implement at least a portion of a heat recovery optimization system 35, embodiments of which will be described in more detail below. Generally speaking, the heat recovery optimization system 35 may communicate with the field devices 15, 16, the controllers 12B, 14B, the rotating equipment 20 or its supporting computer 22, the power generation equipment 25 or its supporting computer 26, and any other desired devices and equipment within the process plant 10, to receive information regarding the operation of the devices or subsystems that they are monitoring. In particular, the heat recovery optimization system 35 may communicate with field devices, controllers, sensors and any other desired device and equipment associated with one or more heat exchangers or heat exchange systems, as may be found within oil refineries, for example. The heat recovery optimization system 35 may be communicatively connected via a hardwired bus 45 to each of at least some of the computers or devices within the plant 10 or, alternatively, may be connected via any other desired communication connection including, for example, wireless connections, dedicated connections which use OPC, intermittent connections, such as ones which rely on handheld devices to collect data, etc. Likewise, the heat recovery optimization system 35 may obtain data pertaining to the field devices and equipment within the process plant 10 via a LAN or a public connection, such as the Internet, a telephone connection, etc. (illustrated in FIG. 1 as an Internet connection 46) with such data being collected by, for example, a third party service provider. Further, the heat recovery optimization system 35 may be communicatively coupled to computers/devices in the plant 10 via a variety of techniques and/or protocols including, for example, Ethernet, Modbus, HTML, XML, proprietary techniques/protocols, etc. Still further, the heat recover optimization system 35 may be implemented as one or more controllers of the heat exchanger network, such as a controller for a particular heat exchanger, where the controller is communicatively coupled to computers, devices and/or other controllers in the plant 10. Thus, although particular examples using OPC to communicatively couple the heat recovery optimization system 35 to computers/devices in the plant 10 are described herein, one of ordinary skill in the art will recognize that a variety of other methods of coupling the heat recovery optimization system 35 to computers/devices in the plant 10 can be used as well.

Figure 2A:
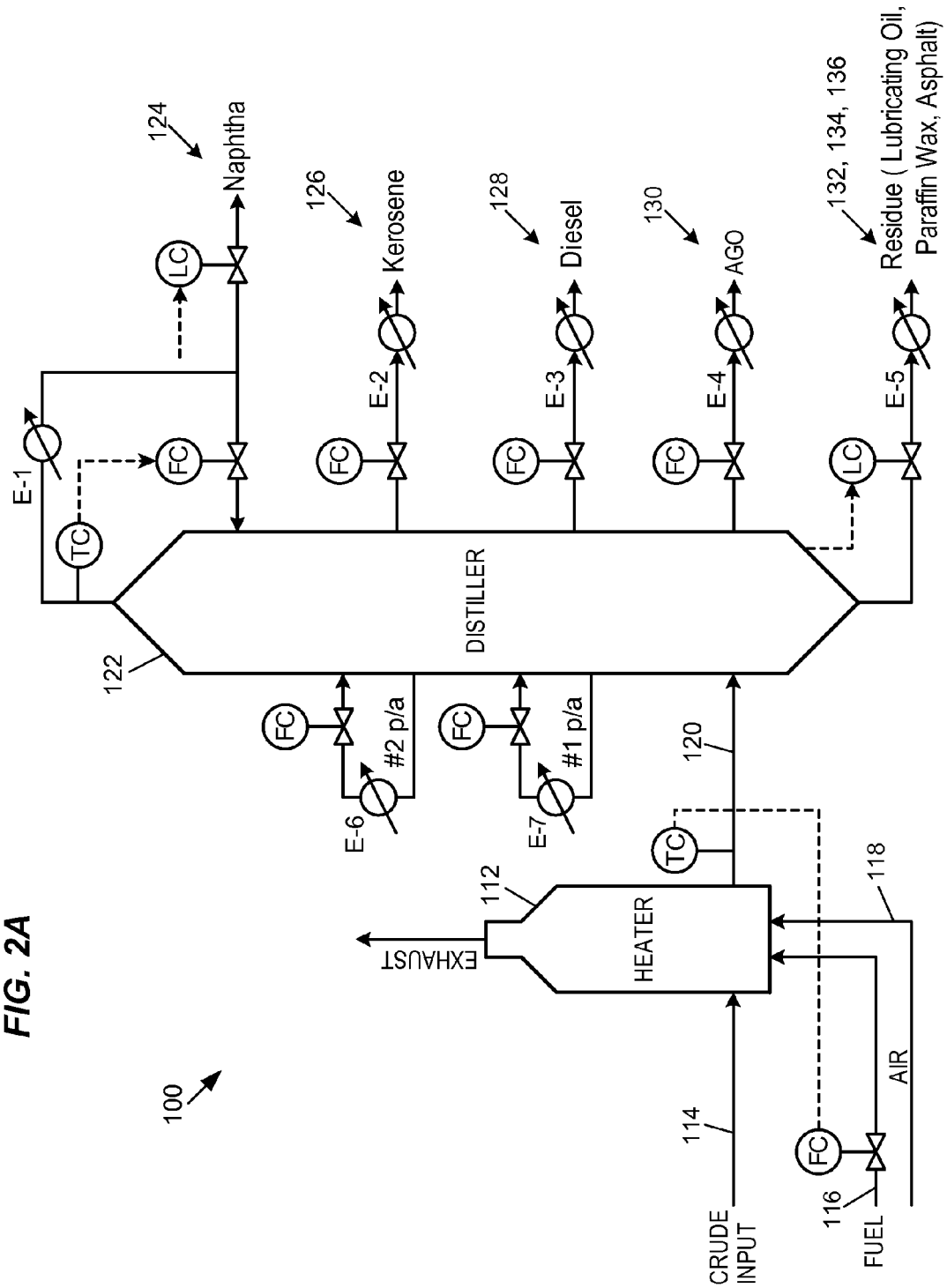
FIGS. 2A-2C are schematic views of a portion of the process plant of FIG. 1, illustrating an oil refinery process and system including heat exchanger networks that may utilize a heat recovery maximizing system in accordance with the teachings of the disclosure.
Figure 2B:
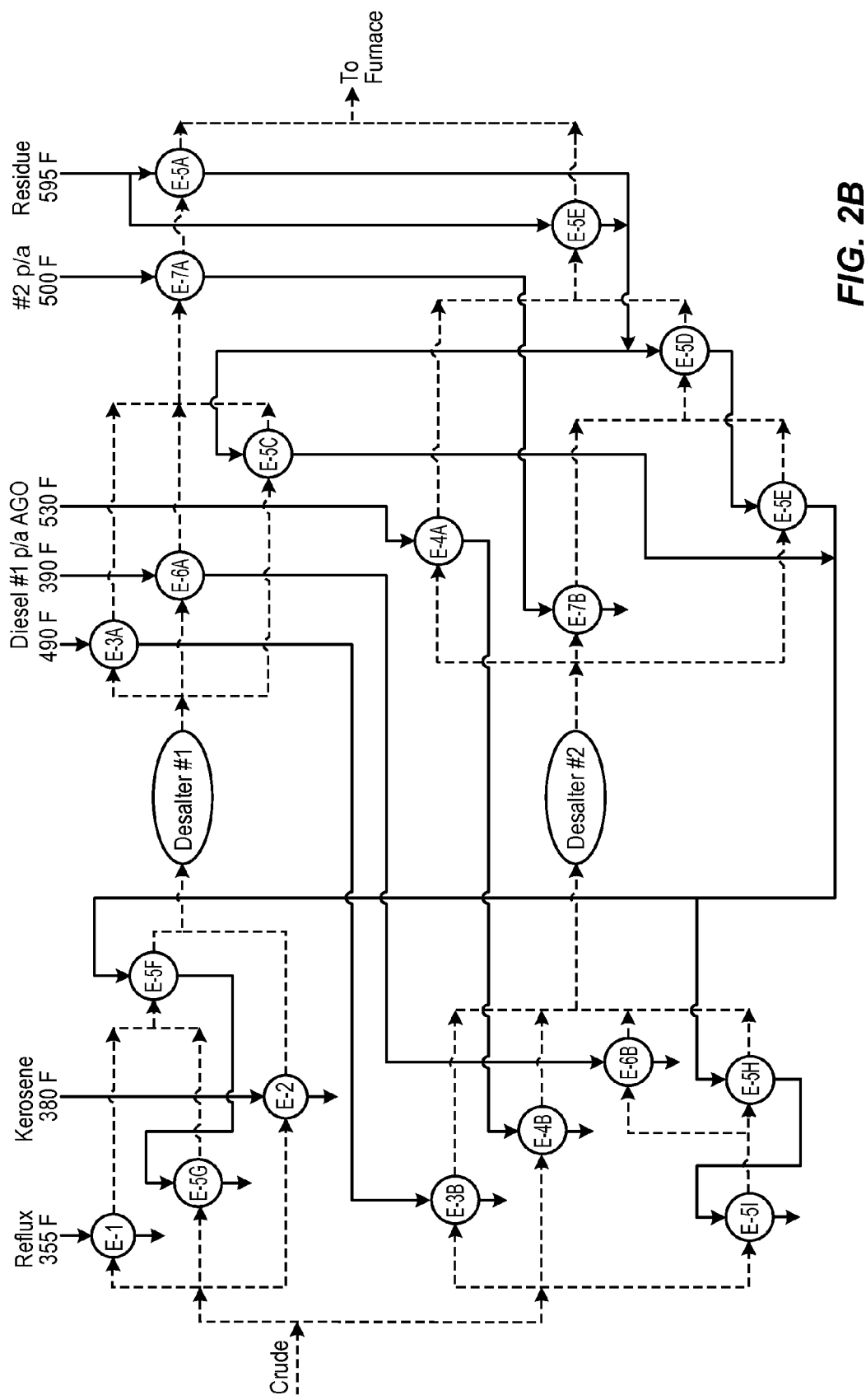
Figure 2C:
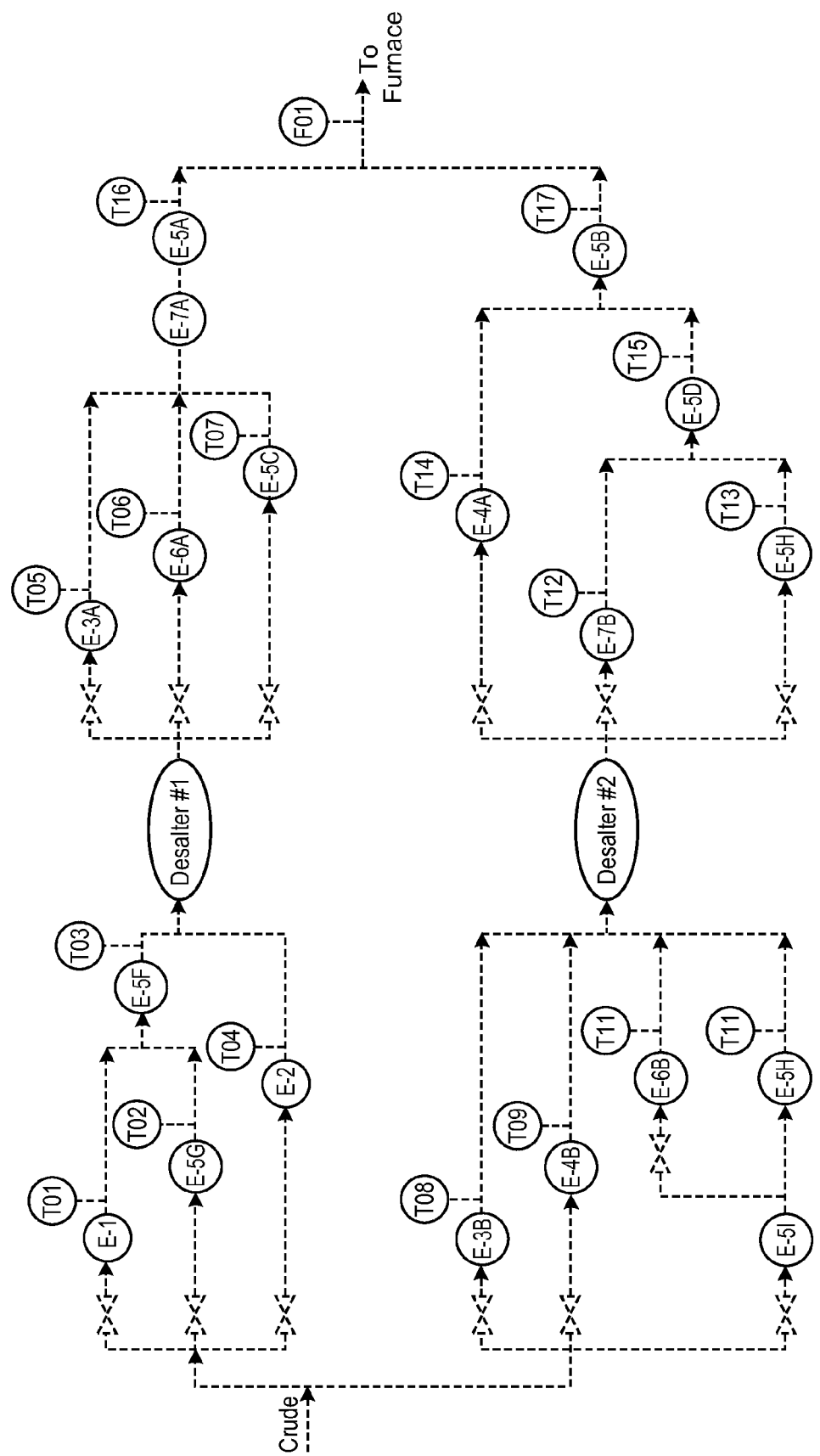

The first unit in a typical oil refinery is the crude unit, similar to that shown in FIGS. 2A-2C, where crude oil is fractionated into primary products such as naphtha (gasoline) 124, kerosene 126, diesel 128, AGO (fuel oil) 130, residue products (e.g., lubricating oil 132, paraffin wax 134, asphalt 136, etc.), and others. This is achieved in a distiller 122, which may also be referred to as a pipe still, fractionators, or atmospheric (and sometimes vacuum) fractionator. The crude is heated so that it flashes when entering the distiller 122. Like any distillation process, latent heat is removed as some of the vapors are condensed and returned as reflux which cascades down the distiller 122. The rising vapors (flashed crude) and falling liquid reflux mix in the distiller 122 to produce product separation that occurs over a range of equilibrium stages. As products such as gasoline and kerosene are withdrawn higher in the column, additional reflux must be added below for the column to function properly. Pumparounds are used to remove sensible heat and sub cool liquid which is returned to the column to increase condensation to produce additional internal reflux. Products are removed hot and the sensible heat can be recovered as well. The heat required to flash the crude is provided in a charge heater 112. Crude oil is transported to a heater 112 through a crude oil input line 114. Fuel is transported to the heater 112 through a fuel input line 116 and air is transported to the heater 112 through an air input line 118. The fuel and air are mixed and combusted in the heater 112 and heat generated by the combustion is partially transferred to the crude oil. After heating, the crude oil is transported through a transport line 120 to the distiller 122.

The fuel required can be reduced, saving both the cost of fuel and the resulting emissions related to combustion of the extra fuel by recovering as much process heat in the feed as possible before the feed enters the heater. Heat exchange networks are designed based on a design case to maximize heat recovery from reflux condensers, pumparound exchangers, product coolers, etc. The crude feed is routed through these various heat exchangers or heat exchanger systems (designated E-1 to E-7) in a complex path where some heat exchangers will operate in parallel and some in series (e.g., E-5A to E-5I). An example of such a complex network is shown in FIG. 2B, with the hot streams shown in bold lines and the cool streams shown in dashed lines. For design purposes, operating flow rates and temperatures are chosen and compromises are made to come up with a cost effective heat exchanger network design. In reality, changes in crude composition, product specifications, ambient conditions, heat exchanger fouling, and other dynamic factors, it is generally coincidental and improbable that the process would be at exact design conditions. The control problem becomes one of allocating the feed through the different paths in the network to maximize heat recovery from the available process heat.

The variability introduced into the heat exchange system due to varying crude feedstock quality and varying refined product demand present additional problems to process control and heat recovery systems. This variability appears in the amount of heat available to preheat the crude charge. A process control system must stabilize the heat exchange process as the crude feed and/or refined products vary. Such variability may include a changing amount of heat available from the distilled products and a changing coefficient of heat of the crude feed. If possible, the process control system should also optimize the heat exchange process by maximizing heat recovery in the crude feed.

Figure 3:
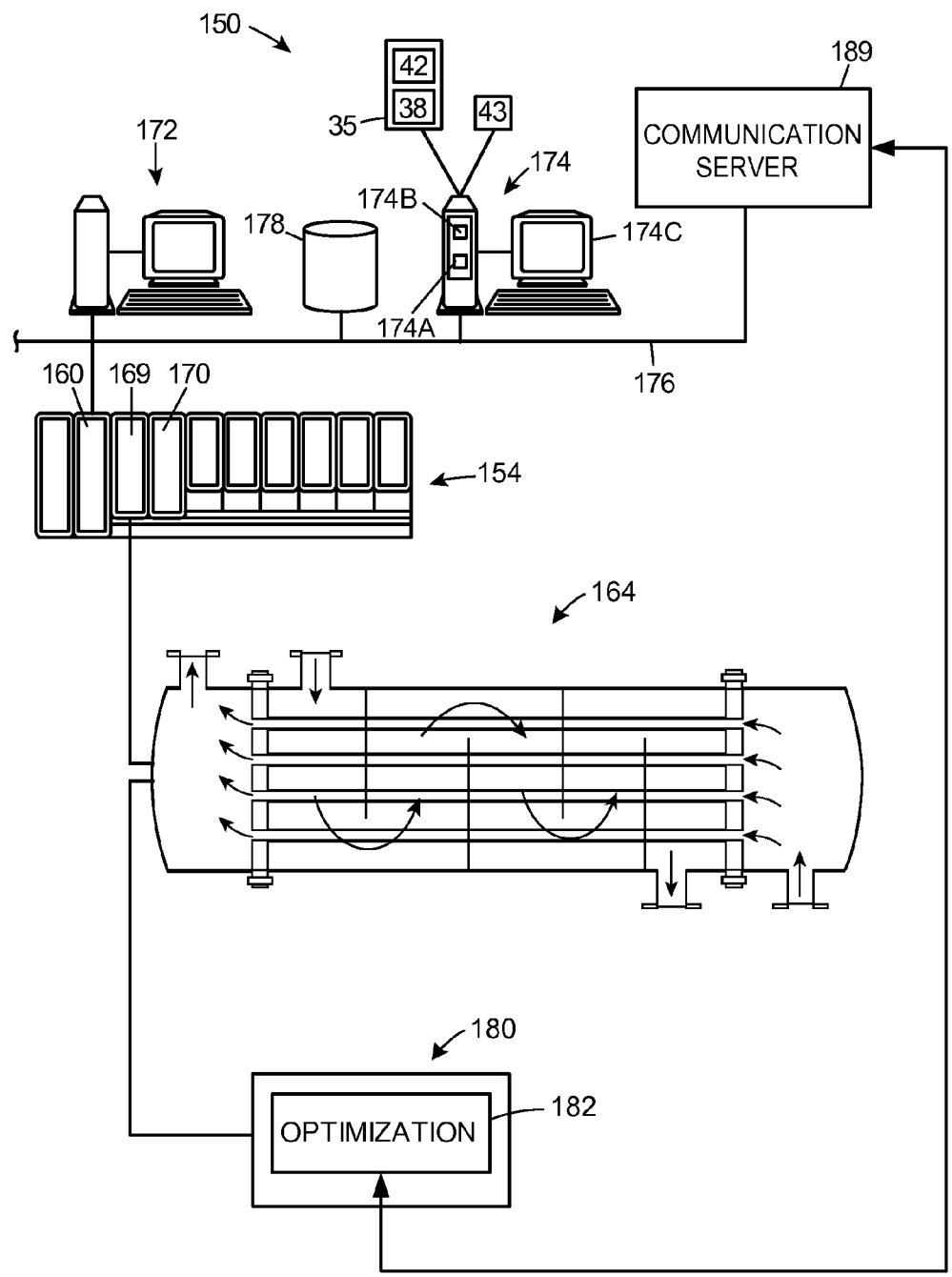
FIG. 3 is an exemplary block diagram of a portion of the process plant of FIG. 1, illustrating communication interconnections between various components of a heat recovery maximizing system located within different elements of the process plant including a heat exchanger.

FIG. 3 illustrates a portion 150 of the example process plant 10 of FIG. 1 for the purpose of describing one manner in which the heat recovery optimization system 35 may communicate with a heat exchanger 164 in the portion 150 of the example process plant 10. While FIG. 3 illustrates communications between the heat recovery optimization system 35 and the heat exchanger 164, it will be understood that similar communications can occur between the heat recovery optimization system 35 and other devices and equipment associated with the heat exchanger within the process plant 10, including any of the devices and equipment illustrated in FIGS. 1 and/or 2. In addition, while the examples provided herein may relate to heating crude oil streams using hot process fluid streams of distilled products, the heat recovery maximization techniques may also be applied to cooling fluid streams, as well as to various types of process fluids, solids or gases.

The portion 150 of the process plant 10 illustrated in FIG. 3 includes a distributed process control system 154 having one or more process controllers 160 connected to one or more heat exchangers 164 via input/output (I/O) cards or devices 169 and 170, which may be any desired types of I/O devices conforming to any desired communication or controller protocol. Additionally, the heat exchanger 164 may conform to any desired open, proprietary or other communication or programming protocol, it being understood that the I/O devices 169 and 170 should be compatible with the desired protocol used by the heat exchanger 164. Although not shown in detail, the heat exchanger 164 may include any number of additional devices, including, but not limited to, field devices, HART® devices, sensors, valves, transmitters, positioners, etc.

In any event, one or more user interfaces or computers 172 and 174 (which may be any type of personal computer, workstation, etc.) accessible by plant personnel such as configuration engineers, process control operators, maintenance personnel, plant managers, supervisors, etc. are coupled to the process controllers 160 via a communication line or bus 176 which may be implemented using any desired hardwired or wireless communication structure, and using any desired or suitable communication protocol such as, for example, an Ethernet protocol. In addition, a database 178 may be connected to the communication bus 176 to operate as a data historian that collects and stores configuration information as well as on-line process variable data, parameter data, status data, and other data associated with the process controllers 160 and heat exchanger 164 and other field devices within the process plant 10. Thus, the database 178 may operate as a configuration database to store the current configuration, including process configuration modules, as well as control configuration information for the process control system 154 as downloaded to and stored within the process controllers 160 and the devices of the heat exchanger 164 and other field devices. Likewise, the database 178 may store historical optimization data, including statistical and sensor data collected by the heat exchanger 164 (or, more particularly, devices of the heat exchanger 164) and other field devices within the process plant 10, statistical data determined from process variables collected by the heat exchanger 164 (or, more particularly, devices of the heat exchanger 164) and other field devices, and other types of data that will be described below.

While the process controllers 160, I/O devices 169 and 170, and the heat exchanger 164, are typically located down within and distributed throughout the sometimes harsh plant environment, the workstations 172 and 174, and the database 178 are usually located in control rooms, maintenance rooms or other less harsh environments easily accessible by operators, maintenance personnel, etc. Although only one heat exchanger 164 is shown in FIG. 3, it should be understood that a process plant 10 often has multiple heat exchangers 164 networked together along with various other types of equipment such as that shown in FIGS. 1 and/or 2. The heat recovery optimization techniques described herein may be equally applied to any of a number of heat exchangers 164.

Generally speaking, the process controllers 160 may store and execute one or more controller applications that implement control strategies using a number of different, independently executed, control modules or blocks. The control modules may each be made up of what are commonly referred to as function blocks, wherein each function block is a part or a subroutine of an overall control routine and operates in conjunction with other function blocks (via communications called links) to implement process control loops within the process plant 10. As is well known, function blocks, which may be objects in an object-oriented programming protocol, typically perform one of an input function, a control function, or an output function. For example, an input function may be associated with a transmitter, a sensor or other process parameter measurement device. A control function may be associated with a control routine that performs PID, fuzzy logic, or another type of control. Also, an output function may control the operation of some device, such as a valve, to perform some physical function within the process plant 10. Of course, hybrid and other types of complex function blocks exist, such as model predictive controllers (MPCs), optimizers, etc. It is to be understood that while the Fieldbus protocol and the DeltaV™ system protocol use control modules and function blocks designed and implemented in an object-oriented programming protocol, the control modules may be designed using any desired control programming scheme including, for example, sequential function blocks, ladder logic, etc., and are not limited to being designed using function blocks or any other particular programming technique.

As illustrated in FIG. 3, the workstation 174 includes a processor 174A, a memory 174B and a display device 174C. The memory 174B stores the heat recovery optimization system 35, which may be implemented as an application in a manner that this application can be implemented on the processor 174A to provide information to a user via the display 174C (or any other display device, such as a printer).

The heat exchanger 164 and, in particular, the devices connected to the heat exchanger 64, may include a memory (not shown) for storing routines such as routines for implementing statistical data collection pertaining to one or more process variables sensed by sensing devices and/or routines for abnormal operation detection, that will be described below. Each of one or more of the heat exchangers 164, and/or some or all of the devices thereof in particular, may also include a processor (not shown) that executes routines such as routines for implementing statistical and sensory data collection and/or routines for heat recovery maximization or optimization. Statistical and sensory data collection and/or heat recovery maximization need not be implemented by software. Rather, one of ordinary skill in the art will recognize that such systems may be implemented by any combination of software, firmware, and/or hardware within one or more field devices and/or other devices.

As shown in FIG. 3, the devices of the heat exchanger 164, and/or the heat exchanger 164 itself (and potentially some or all heat exchangers in a plant 10) include(s) one or more heat recovery maximization blocks 180, that will be described in more detail below. While the block 180 of FIG. 3 is illustrated as being located in the heat exchanger 164, this or a similar block may be specific to the heat exchanger network as a whole, where the heat exchanger network include further elements such as sensors and control valves operatively coupled to the heat recovery maximization block 180. Further, the heat recovery maximization block 180 could be located in any number of heat exchangers 164 or within various other equipment and devices in the plant 10, in other devices, such as the controller 160, the I/O devices 169, 170 or any of the devices illustrated in FIG. 1. Additionally, if the plant 10 or portion of the plant 150 includes more than one heat exchanger 164, the block 180 could be in any subset of the heat exchanger 164, such as in one or more devices of the heat exchanger 164, for example (e.g., temperature sensor, temperature transmitter, etc.).

Generally speaking, the block 180 or sub-elements of the block 180, collect data, such a process variable data, from the device in which they are located and/or from other devices. For example, the block 180 may collect an inlet raw fluid temperature variable and an outlet raw fluid temperature variable from devices within the heat exchanger 164, such as a temperature sensor, a temperature transmitter, or other devices, or may determine the inlet and outlet temperature variables from temperature measurements from the devices. The block 180 also collect flow rate variables from devices within the heat exchanger 164, such as a flow rate sensor, a temperature transmitter, or other devices, or may determine the inlet and outlet temperature variables from temperature measurements from the devices. The block 180 may be included with the heat exchanger 164 and may collect data through valves, sensors, transmitters, or any other field device. Additionally, the block 180 or sub-elements of the block may process the variable data and perform an analysis on the data for any number of reasons. For example, the block 180 that is illustrated as being associated with the heat exchanger 164, may have an optimization routine 182 that analyzes several process variables of the heat exchanger 164 as further explained below.

Figure 4:
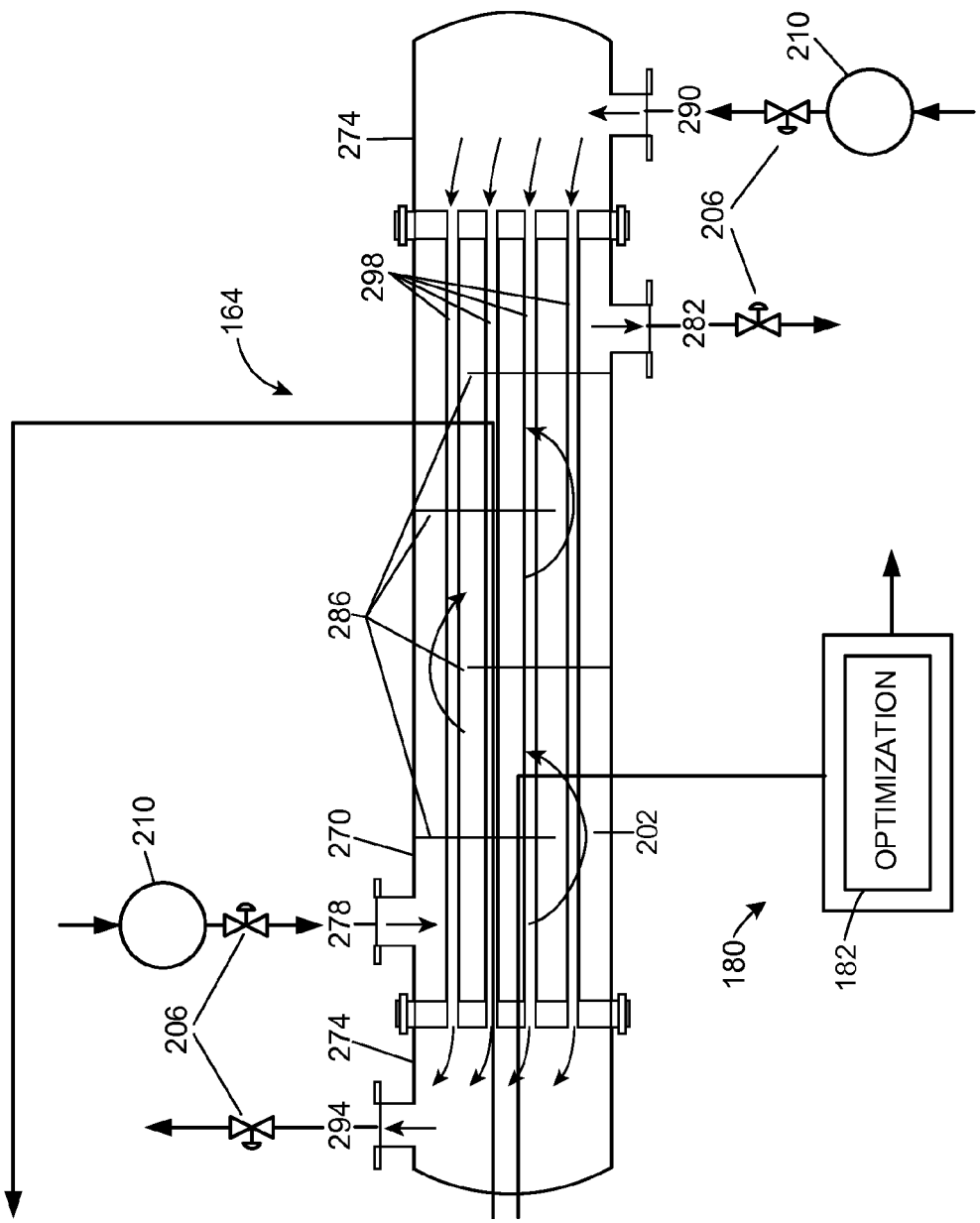
FIG. 4 is an exemplary schematic diagram of a portion of the process plant of FIG. 1, illustrating a shell and tube heat exchanger.

With reference to FIG. 4, the heat recovery maximization block 180 may monitor the heat exchanger 164 to check whether heat maximization/optimization is being achieved. While those skilled in the art will understand that the techniques described herein may be utilized with a variety of heat exchanger types, the provided example refers to a shell and tube type heat exchanger 164 for the purpose of describing the techniques in this disclosure. A shell and tube type heat exchanger 164 may include a shell portion 270 and a tube portion 274. The shell portion 270 may include an inlet 278, an outlet 284, and a number of baffles 286. The tube portion 274 may include an inlet 290, an outlet 294, and a number of tubes 298 surrounded by the shell portion 270. In operation, cool fluid enters the shell portion 270 through the inlet 278, surrounds the tubes 298, flows around the baffles 286 to create turbulence 202, and continues to the outlet 284. Simultaneously, hot fluid enters the inlet 290, flows through the tubes 298 where the turbulent cool water absorbs the heat of the fluid, and continues to the outlet 294. Thus, the heat exchanger 164 reduces the temperature of the hot fluid. Of course, the process may be reversed, whereby a cool fluid enters the inlet 290 and hot fluid enters the inlet 278. The inlets 278, 290 and outlets 292, 294 may also include any number of field devices (not shown), controllers (not shown), valves 206, pumps 210, or other devices that measure and control the fluid temperature, flow pressure, flow rate, and other metrics during operation of the heat exchanger 164. It should be understood that the terms "hot" and "cool" are utilized to differentiate between the two streams, as opposed to necessarily describing the temperatures of the two streams. For example, where crude oil is provided to the heat exchanger for heating through the cool process stream, it is understood that the temperature of the crude oil is not "cool" at the cool process stream outlet of the heat exchanger. Likewise, in a reverse heat exchanger to cool the hot process stream, the temperature of the distilled product is not necessarily "hot" at the hot process stream outlet of the heat exchanger.

In a typical heat exchanger application, several measurements may be available. Some examples of heat exchanger 164 measurements are Cool Fluid Flow Rate ($F_c$), Cool Fluid Inlet Temperature ($T_{c,in}$), Cool Fluid Outlet Temperature ($T_{c,out}$), Cool Fluid Inlet Pressure ($P_{c,in}$), Cool Fluid Outlet Pressure ($P_{c,out}$), Hot Fluid Flow Rate ($F_h$), Hot Fluid Inlet Temperature ($T_{h,in}$), Hot Fluid Outlet Temperature ($T_{h,out}$), Hot Fluid Inlet Pressure ($P_{h,in}$), and Hot Fluid Outlet Pressure ($P_{h,out}$). Some heat exchangers 164 may capture only a few of these measures, while others may modify the measurements. One example of a modified measurement may be to only include a single measurement of differential temperature instead of separate inlet and outlet temperatures. However, for the heat recovery maximization technique described herein, only one measurement (namely, the cool fluid outlet temperature) need be captured per heat exchanger, and where the heat exchangers are located in series in the same path, only the outlet temperature for the path (generally the last heat exchanger in the path) need be measured.

Heat recovery maximization in a heat exchanger 164 may include some or all of the measurements described above. One method of heat recovery maximization may include monitoring a differential temperature. Differential temperature may be measured by (1) a differential temperature transmitter across the heat exchanger to measure the differential temperature (ΔT) directly, or (2) absolute temperature transmitters to measure the inlet temperature $T_{in}$ outlet temperature $T_{out}$ on the heat exchanger or heat exchanger path. Thus, $$\Delta T = T_{in} - T_{out} \quad \text{(Equ. 1)}$$

Further, ΔT may permit a heat recovery maximization block 180 at both the hot and cool sides of the heat exchanger 164 or heat exchanger path to measure and detect the $T_{in}$ and $T_{out}$ values. Examples of these temperature measurements are shown in FIG. 2C, where temperature sensors/transmitters (designated T01 to T17) are provided at the output of each heat exchanger.

Another method of heat recovery maximization may include monitoring the heat transfer or heat recovery (Q). The heat recovery (Q) in heat exchanger may be calculated by an explicit formula using measurements on either the hot side or the cool side:

$$Q = m_c \cdot C_c \cdot \Delta T_c = m_h \cdot C_h \cdot \Delta T_h \quad \text{(Equ. 2)}$$

here $m_c$ and $m_h$ are mass-flow rates of the cool and hot fluids, $C_c$ and $C_h$ are the specific-heat capacities for the cool and hot fluids (which is assumed constant over a small range), $\Delta T_c$ and $\Delta T_h$ are the temperature differences of the cool and hot fluids with $\Delta T_c = T_{c,out} - T_{c,in}$ and $\Delta T_h = T_{h,in} - T_{h,out}$. $C_c$ and $C_h$ ($C_p$) are generally constant for short time periods, and for a given application, the terms $C_c$ and $C_h$ may be considered constant.

The heat recovery maximization may also be calculated using the Log-Mean-Temperature Difference (LMTD) and properties of the heat exchanger.

$$Q = U \cdot A \cdot \text{LMTD} \quad \text{(Equ. 3)}$$

where U is the average heat transfer coefficient, A is the heat transfer surface area of the heat exchanger, LMTD is the Log-Mean-Temperature-Difference, defined as:

$$LMTD = \frac{\Delta t_1 - \Delta t_2}{\ln(\Delta t_1 / \Delta t_2)} \quad \text{(Equ. 4)}$$

where, for a parallel, or concurrent flow heat exchanger:

$$\Delta t_1 = t_{h,in} - t_{c,in}, \Delta t_2 = t_{h,out} - t_{c,out} \quad \text{(Equ. 5)}$$

and for a counter-flow heat exchanger:

$$\Delta t_1 = t_{h,in} - t_{c,out}, \Delta t_2 = t_{h,out} - t_{c,in} \quad \text{(Equ. 6)}$$

Although A of Equ. 3 may be obtained from product literature, U may be difficult to determine analytically. However, U and A may be taken together as a single variable, the overall total heat transfer rate.

Figure 5:
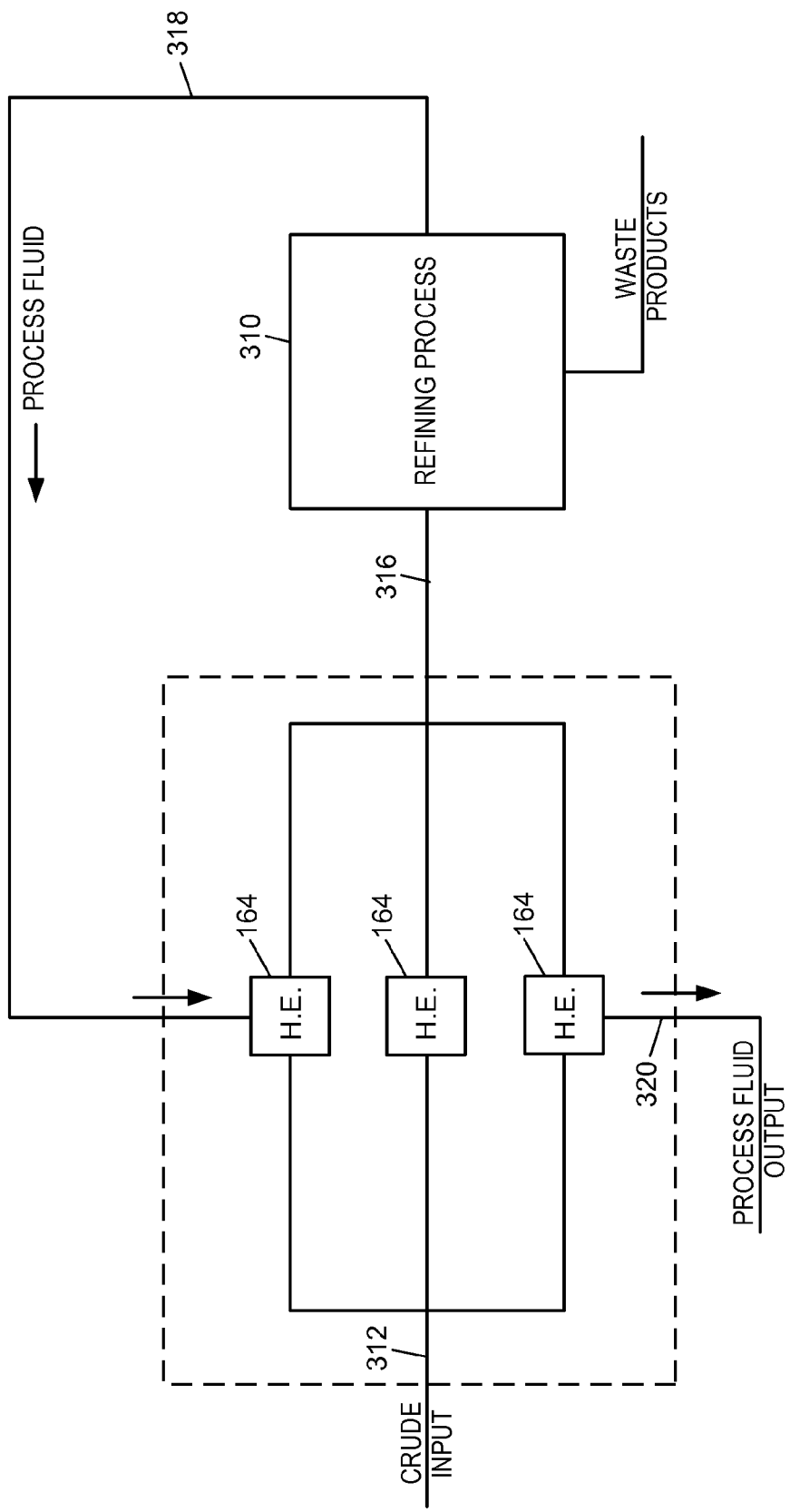
FIG. 5 is an exemplary block diagram of a process control system of FIG. 1, illustrating a network of heat exchangers, such as those of FIG. 4, providing multiple parallel paths.

FIG. 5 schematically represents an oil refinery 300 including a refining process 310, such as thermal cracking and/or distillation, which may implement multiple heat exchangers 164, including the blocks 180, to provide a network of heat exchangers having multiple paths for preheating the crude oil prior to entry into the heater 112. A crude input line 312 transports crude oil to the refinery 300. Although the network is shown as having a single heat exchanger 164 in each path, the crude oil may be preheated through a series of heat exchangers 164 arranged in parallel paths, an example of which is shown in more detail below. After preheating, the crude oil is transported to the refining process (which may include the heater 112 of FIGS. 2A-2C) through an intermediate line 316. Following the refining process, refined products, such as distilled products, retain sensible heat from the preheating process and the refining process. These refined products are transported through a transfer line 318 back to the heat exchangers 164, where some of the sensible heat is transferred from the refined products to the incoming crude oil. After circulating through the heat exchangers 164, the refined products are transported through a process fluid output 320 for further processing and/or sale.

Figure 6:
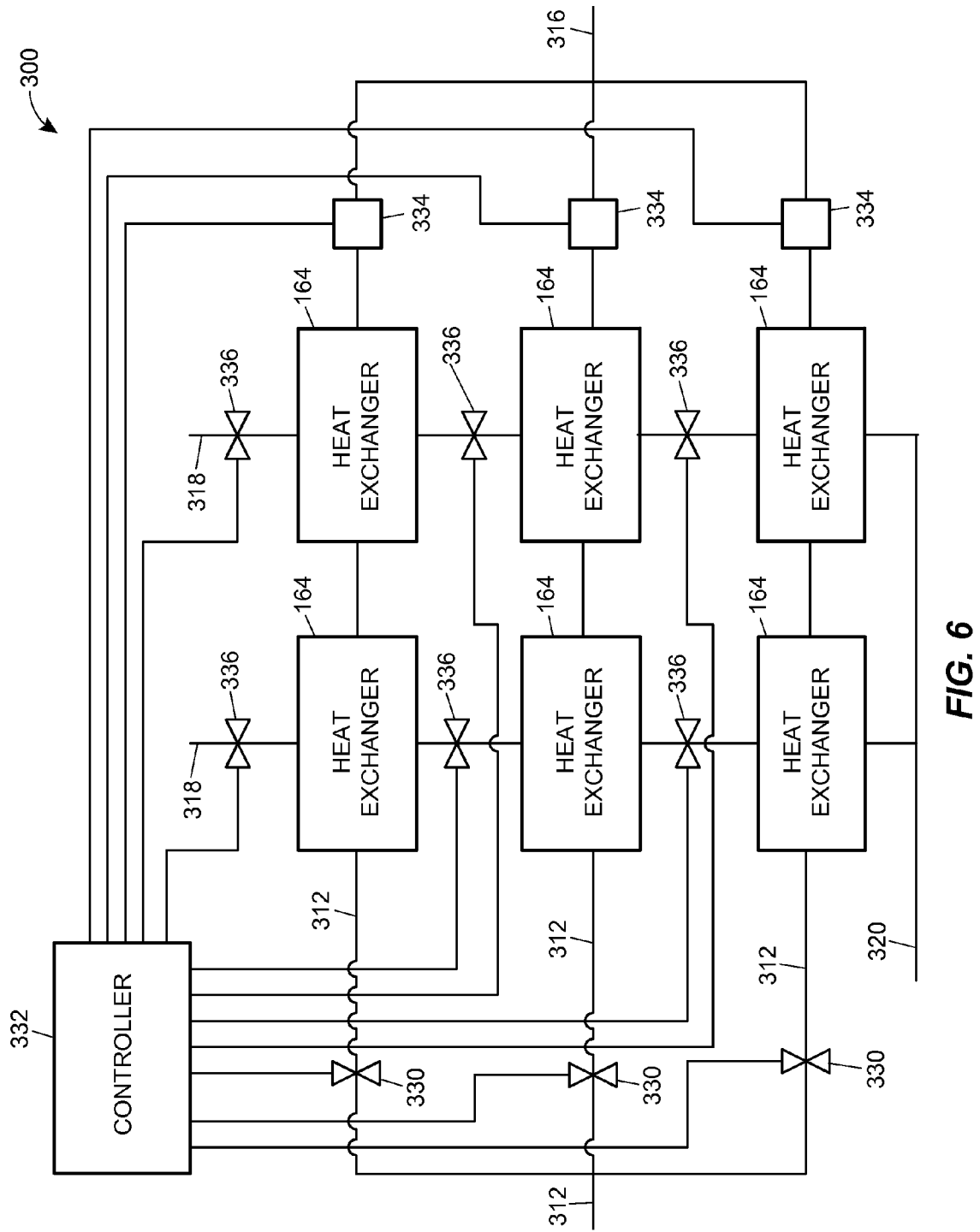
FIG. 6 is a an exemplary block diagram of a process control system of FIG. 5, illustrating the network of heat exchangers in communication with a controller.

FIG. 6 schematically represents a parallel path heat recovery maximizer system 300 included in the box labeled 322 in FIG. 5, and is provided as a simplified example of a heat exchanger network as compared to those shown in FIGS. 2B and 2C. In this example, heat exchangers are provided in series in multiple parallel paths. Those skilled in the art will recognize that different heat exchanger networks may be provided, including different numbers of parallel paths, and different numbers of heat exchangers in each serial paths which may provide complex path with parallel and serial arrangements. Each heat exchanger input line 312 includes a control valve 330. The control valves 330 regulate flow of the crude oil through the heat exchanger 164. Each control valve 330 is operatively connected to a controller 332 that opens and closes the control valves to set a desired flow rate of crude oil through each heat exchanger 164. Downstream of each heat exchanger path is a temperature sensing device 334, such as a thermometer or thermostat. The temperature sensing device 334 measures a temperature of the crude oil exiting each heat exchanger 164, or, in the case of a series of heat exchangers 164 in a path, measures the temperature of the crude oil exiting the last heat exchanger 164 in the path. The temperature sensing devices 334 sends the temperature information to the controller 332. Each heat exchanger 164 also includes a refined products flow control valve 336. The process fluid control valve 336 controls the flow rate of the refined products through the heat exchanger 164. The controller 332 controls each control valve 330, 336 independently of one another and adjusts each control valve 330, 336 based on a respective temperature reading of crude oil exiting each heat exchanger 164.

Due to differences in efficiency between the heat exchangers 164 that arise over time, the controller 332 optimizes heat recovery by balancing crude flow rates into the heat exchangers 164 according to the efficiency of each heat exchanger. The controller 332 maintains optimum heat recovery over a wide range of conditions such as varying flow rates, varying crude input temperatures, and varying crude oil quality. The controller accomplishes the maximization through load allocation, known as Incremental Cost Equalization (ICE). The optimization works on the notion that if the incremental costs are not equal, then the load should be shifted from the unit (path) with the higher incremental cost to the unit (path) with the lower incremental cost. Accordingly, in ICE, the controller 332 shifts loads from a higher incremental cost (i.e., less efficient) heat exchanger 164 to a lower incremental cost (i.e., more efficient) heat exchanger 164.

While some previous load allocations utilized a method for calculating the cost as a function of load, there did not exist an explicit expression or model for calculating efficiency as a function of load. Instead, previous load allocation expressions or models were developed empirically and fit to a cubic polynomial, and differentiated with respect to load in order to obtain an explicit model of incremental cost. However, heat exchanger efficiency may be expressed similar to that given above as Equ. 2, which is an explicit function that describes the heat recovery for each path as a function of feed (also referred to as load). By differentiating Equ. 2 with respect to feed, the incremental cost for a multiple parallel path or multiple heat exchanger system for preheating crude, such as that shown in FIGS. 5 and 6, may be determined by:

$$I.C. = \frac{\delta Q}{\delta m} C_p (T_{Out} - T_{In}) \qquad \text{(Equ. 7)}$$

Because $C_p$ and $T_{In}$ are identical for each parallel path, the controller 332 needs only to equalize $T_{Out}$ to maximize the heat recovery. For example, referring to FIG. 2C, T01=T02, T03=T04, T05=T06=T07, T08=T09=T10=T11, T12=T13, T14=T15, T16=T17, and F01=final temperature in the intermediate line 316, However, process constraints may prohibit equalization of output temperatures in some cases. As with many optimizers, constraints for minimum and maximum flows and temperatures on both the crude ("cool") side and the "hot" side should be enforced. For example, the heat exchanger 164 may require minimum and/or maximum flow rates to prevent damage to the heat exchanger 164. The controller 332 respects such limits when attempting to equalize the output temperatures by ensuring that individual flow rates remain within the range defined by the minimum and maximum flow rates. Furthermore, the controller 332 may include a damping routine to prevent overcontrolling and/or controller induced oscillations in the exit temperatures that may complicate the downstream refining process. Accordingly, a routine, described further below, may be developed to monitor the output temperatures of each heat exchanger 164 or heat exchanger path, and adjust the flow rates accordingly to equalize the output temperatures of each heat exchanger 164 or heat exchanger path as needed.

As compared to known optimizer systems, the disclosed heat recovery maximizer system 300 is more sensitive and more efficient, because the system 300 measures and adjusts output temperature for each heat exchanger 164 or heat exchanger path, thus achieving greater overall efficiency of heat recovery. Most other optimizers utilize a "search routine" to find the optimum blended temperature after the streams are rejoined (e.g., in intermediate line 316). However, the dynamics of a typical refinery are such that small changes may not lead to a clear change in the blended temperature that indicates an improvement or worsening of the heat recovery, and a larger change leads to limit cycling. On the other hand, the approach described above and further below does not necessarily require any information about what is happening on the "hot" side and does not have to wait for a change to propagate through the system before identifying a solution. That is, the differences in the outlet temperatures of each parallel path may be used to optimize heat recovery in the system, as demonstrated by Equ. 6 and Equ. 7, rather than having to wait for a change to occur in the elsewhere in the system (e.g., in the intermediate line 316 or later in the process) that is significant enough to indicate an inefficiency in the heat recovery.

Figure 7:
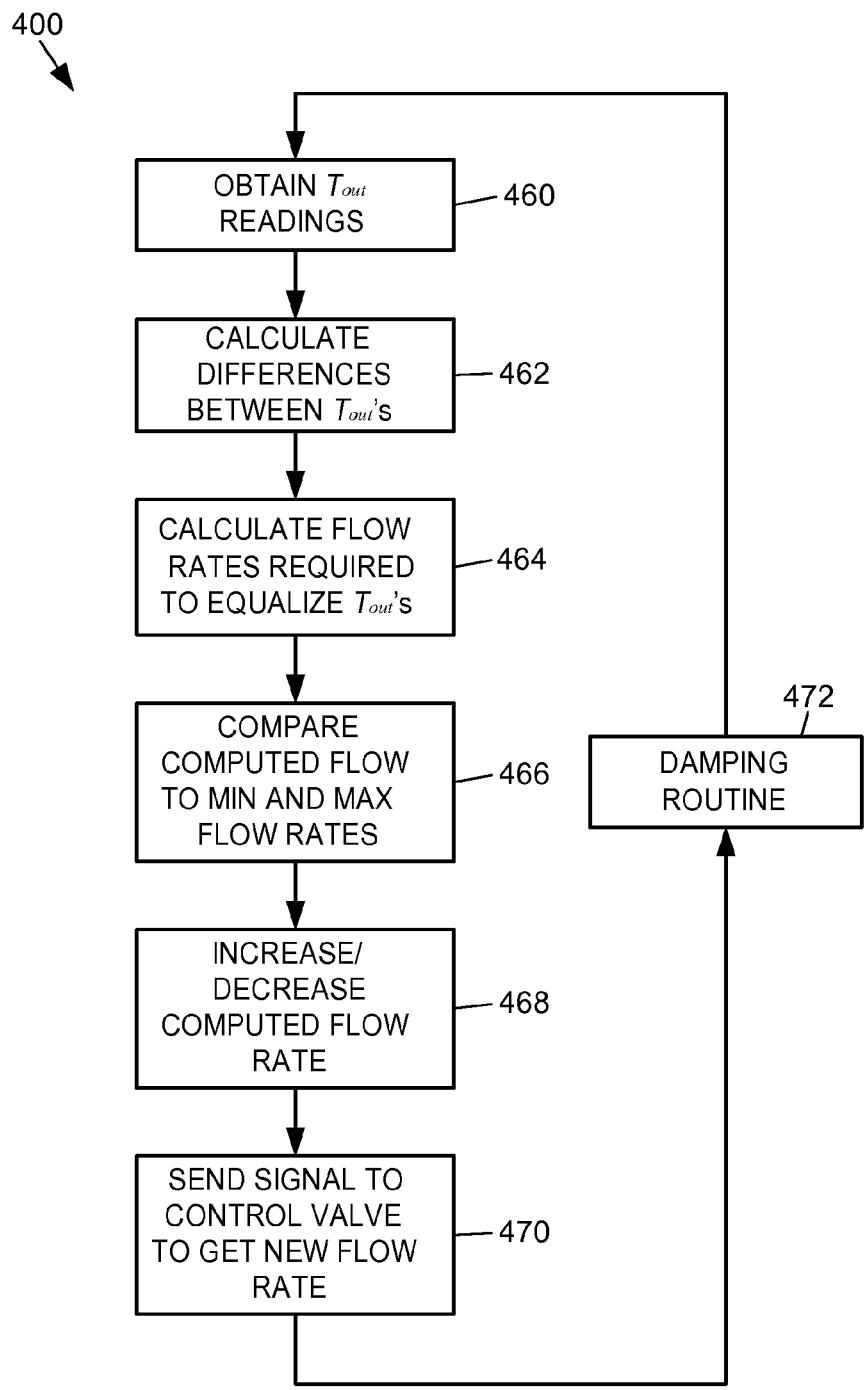
FIG. 7 is an example of a flow diagram for heat recovery maximization in a network of heat exchangers, as in FIG. 6.

FIG. 7 illustrates an example of a logic routine 400 that may be employed, for example, by the controller 332 of FIG. 6 as part of the optimization routine 182 in the block 180. However, it should be understood that the logic routine 400 may be implemented in any part of the process control system, and implementation in the controller 332 is merely by way of example. The logic routine 400 may also be implemented as part of a model of the heat exchanger 164, the heat exchanger network, the portion 150 of the process plant 10, the distillation system 100, the process control system, etc. As such, the logic routine 400 may be implemented as part of a larger process control routine.

Referring to the routine 400, in order equalize the output temperatures $T_{Out}$ among the parallel paths and optimize heat recovery, the controller 332 may obtain output temperature $T_{Out}$ readings from the temperature sensing devices 334 (FIG. 6) in the output streams of each heat exchanger 164 or heat exchanger path (FIG. 6) at block 460. Similar to the differential temperature (ΔT) discussed above, differential output temperatures may be measured by (1) a differential temperature transmitter across the heat exchangers 164 or heat exchanger paths to measure the differential temperature ($\Delta T_{Out}$) directly, or (2) absolute temperature transmitters to measure the outlet temperature $T_{out}$ on each heat exchanger or each heat exchanger path. The routine 400 of FIG. 7 demonstrates the latter case, in which controller 332 calculates the differences between the output temperature readings of each parallel path or heat exchanger 164 at block 462.

At step 464, the controller 332 calculates the flow rates required for each heat exchanger (and, by extension, each heat exchanger path via flow controllers/values FC, some of which are controlled by temperature controllers TC) that will equalize the output temperatures. For example, as shown in Equ. 2 and Equ. 7, it should be understood that there is a relationship between the flow rate m and the outlet temperature $T_{out}$, and that adjustment of the flow rate m will cause a change in the outlet temperature $T_{out}$.

However, as noted above, process constraints for the minimum and/or maximum flows may be provided in order to prevent damage to the heat exchangers 164. Accordingly, the controller 332 may respect these flow rate limits and maintain the flow rates for each heat exchanger 164 within the predefined by the minimum and maximum flow rates. For example, at block 466, the controller 332 compares the calculated flow rates to preset minimum and maximum flow rates. If the calculated flow rate falls outside the constraint parameters (i.e., the range set by the minimum and maximum flow rates), then at block 468, the controller 332 increases or decreases the calculated flow rates so that the calculated flow rates remain between the preset minimum and maximum flow rates. Once the calculated flow rates have been established as needed, and adjusted to remain with minimum and maximum flow rate constraints as needed, the controller 332 may send signals to the control valves (330, 336 in FIG. 6) to set the respective flow rates through respective heat exchangers 164 (or heat exchanger paths), thereby effecting optimization of the heat recovery in the system.

As also discussed above, the controller 332 may include a damping routine to prevent overcontrolling and/or controller induced oscillations in the outlet temperatures. In particular, the optimization routine should react slowly and incrementally, so as to prevent creating additional variability in the process. Additional variability or oscillation in the downstream refining process may cause additional problems that can not be easily attenuated with controls on the "hot" side of the process (i.e., the downstream refining process). Accordingly, at block 472, the controller 332 may execute a damping routine, such as a delay, to prevent overcontrolling. The damping routine may include a delay of anywhere from several seconds to several minutes before the controller next re-executes steps 460-470.

The above-described examples involving heat recovery maximization in a heat exchanger network are disclosed with the understanding that practice of the disclosed systems, methods, and techniques is not limited to such contexts. Rather, the disclosed systems, methods, and techniques are well-suited for use with any diagnostics system, application, routine, technique or procedure, including those having a different organizational structure, component arrangement, or other collection of discrete parts, units, components, or items, capable of selection for monitoring, data collection, etc. Other diagnostics systems, applications, etc., that specify the process parameters being utilized in the diagnostics may also be developed or otherwise benefit from the systems, methods, and techniques described herein. Such individual specification of the parameters may then be utilized to locate, monitor, and store the process data associated therewith. Furthermore, the disclosed systems, methods, and techniques need not be utilized solely in connection with diagnostic aspects of a process control system, particularly when such aspects have yet to be developed or are in the early stages of development. Rather, the disclosed systems, methods, and techniques are well suited for use with any elements or aspects of a process control system, process plant, or process control network, etc.

The methods, processes, procedures and techniques described herein may be implemented using any combination of hardware, firmware, and software. Thus, systems and techniques described herein may be implemented in a standard multi-purpose processor or using specifically designed hardware or firmware as desired. When implemented in software, the software may be stored in any computer readable memory such as on a magnetic disk, a laser disk, or other storage medium, in a RAM or ROM or flash memory of a computer, processor, I/O device, field device, interface device, etc. Likewise, the software may be delivered to a user or a process control system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a process control system via a communication channel such as a telephone line, the Internet, etc. (which are viewed as being the same as or interchangeable with providing such software via a transportable storage medium).

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A system for heat recovery maximization in heat exchange network of a process control system comprising:
   a data collection tool adapted to collect on-line process data from a plurality of heat exchangers during operation of the heat exchangers, wherein the plurality of heat exchangers comprise a network of heat exchangers having multiple parallel paths and wherein the on-line process data is generated from cool process stream outlet temperatures of the multiple parallel paths, each outlet temperature pertaining to the temperature of a cool process stream passed through one or more heat exchangers in the respective path;
   a heat recovery optimization module configured to develop a set of stream flow rate target values based on the on-line process data, wherein the stream flow rate target values comprise intended flow rates of a hot process stream and cool process stream through each heat exchanger to equalize each of the cool process stream outlet temperatures; and
   a controller operatively coupled to the heat recovery optimization module, wherein the controller is configured to control at least one of one or more cool stream flow control valves of the heat exchanger network and one or more hot process stream flow control valves of the heat exchanger network based on the set of stream flow rate target values provided to the controller from the heat recovery optimization module to effect equalization of the cool process stream outlet temperatures.

2. The system for heat recovery maximization of claim 1, wherein the on-line process data comprises a measurement of differential cool process stream outlet temperatures.

3. The system for heat recovery maximization of claim 1, wherein the heat recovery optimization module is configured to determine a difference in temperature between each of the outlet temperatures based on the on-line process data and develop the set of stream flow rate target values based on the difference in temperature.

4. The system for heat recovery maximization of claim 1,
   wherein the heat recovery optimization module is configured to develop a cool process stream outlet temperature target value for all of the heat exchangers based on the on-line process data, wherein the cool process stream outlet temperature target value comprises an intended equalized cool process stream outlet temperature among each of the parallel paths, and
   wherein the heat recovery optimization module is configured to develop the stream flow rate target value for each heat exchanger based on a relationship between the cool process stream outlet temperature target value and the stream flow rate target value for the heat exchanger, wherein the relationship is expressed as:

$$\frac{Q}{C_p \cdot (T_{out,t} - T_{in})} = m$$

where
Q=heat recovery of the heat exchanger,
m=the stream flow rate target value for the heat exchanger,
$C_p$=the heat capacity of the heat exchanger,
$T_{out,t}$=the cool process stream outlet temperature target value, and
$T_{in}$=the cool process stream inlet temperature value.

5. The system for heat recovery maximization of claim 4, wherein $C_p$ is constant.

6. The system for heat recovery maximization of claim 1, wherein the stream flow rate target value is a function of one or more of the group consisting of the cool process stream flow rate and the hot process stream flow rate, a cool process stream inlet temperature, the cool process stream outlet temperature, a hot process stream inlet temperature, and a hot process stream outlet temperature.

7. The system for heat recovery maximization of claim 1,
   wherein the controller is configured to compare each stream flow rate target value to a range of stream flow rate values defined by a predetermined minimum flow rate value and a predetermined maximum flow rate value, wherein the predetermined minimum and maximum flow rate values relate to constraint limits to prevent damage to the heat exchanger, and wherein the controller is configured to adjust each stream flow rate target value to maintain the stream flow rate within the range of stream flow rate values.

8. The system for heat recovery maximization of claim 1, wherein the controller is configured to incrementally adjust one or more flow control valves of each heat exchanger to effect the stream flow rate target value for the heat exchanger without controller-induced oscillations.

9. A method of optimizing heat recovery in a process control system, the method comprising:
collecting on-line process data from a plurality of heat exchangers during operation of the heat exchangers, wherein the plurality of heat exchangers comprise a network of heat exchangers having multiple parallel paths and wherein the on-line process data is generated from cool process stream outlet temperatures of the multiple parallel paths, each outlet temperature pertaining to the temperature of cool process stream passed through one or more heat exchangers in the respective path;
developing a set of stream flow rate target values based on the on-line process data, wherein the stream flow rate target values comprise intended flow rates of the hot process stream and cool process stream through each heat exchanger to equalize each of the cool process stream outlet temperatures; and
controlling at least one of one or more cool stream flow control valves of the heat exchanger network and one or more hot process stream flow control valves of the heat exchanger network based on the set of stream flow rate target values to effect equalization of the cool process stream outlet temperatures.

10. The method of optimizing heat recovery of claim 9, wherein collecting on-line process data from a plurality of heat exchangers comprises collecting measurements of differential cool process stream outlet temperatures.

11. The method of optimizing heat recovery of claim 9, wherein developing a set of stream flow rate target values comprises:
determining a difference in temperature between each of the outlet temperatures based on the on-line process data; and
developing the set of stream flow rate target values based on the difference in temperature.

12. The method of optimizing heat recovery of claim 9, wherein developing a set of stream flow rate target values comprises:
developing a cool process stream outlet temperature target value for all of the heat exchangers based on the on-line process data, wherein the cool process stream outlet temperature target value comprises an intended equalized cool process stream outlet temperature among each of the parallel paths, and
developing the stream flow rate target value for each heat exchanger based on a relationship between the cool process stream outlet temperature target value and the stream flow rate target value for the heat exchanger, wherein the relationship is expressed as:

$$\frac{Q}{C_p \cdot (T_{out,t} - T_{in})} = m$$

where
Q=heat recovery of the heat exchanger,
m=the stream flow rate target value for the heat exchanger,
$C_p$=the heat capacity of the heat exchanger,
$T_{out,t}$=the cool process stream outlet temperature target value, and
$T_{in}$=the cool process stream inlet temperature value.

13. The method of optimizing heat recovery of claim 12, wherein $C_p$ is constant.

14. The method of optimizing heat recovery of claim 9, wherein the stream flow rate target value is a function of one or more of the group consisting of the cool process stream flow rate and the hot process stream flow rate, a cool process stream inlet temperature, the cool process stream outlet temperature, a hot process stream inlet temperature, and a hot process stream outlet temperature.

15. The method of optimizing heat recovery of claim 9, wherein controlling at least one of one or more cool stream flow control valves of the heat exchanger network and one or more process stream flow control valves of the heat exchanger network comprises:
comparing each stream flow rate target value to a range of stream flow rate values defined by a predetermined minimum flow rate value and a predetermined maximum flow rate value, wherein the predetermined minimum and maximum flow rate values relate to constraint limits to prevent damage to the heat exchanger; and
adjusting each stream flow rate target value to maintain the stream flow rate within the range of stream flow rate values.

16. The method of optimizing heat recovery of claim 9, controlling at least one of one or more cool stream flow control valves of the heat exchanger network and one or more process stream flow control valves of the heat exchanger network comprises incrementally adjusting one or more flow control valves of each heat exchanger to effect the stream flow rate target value for the heat exchanger without controller-induced oscillations.

17. A multiple parallel path heat exchanger system comprising:
a cool process stream inlet;
a plurality of heat exchanger paths operatively coupled to the cool process stream inlet, each comprising one or more heat exchangers and each configured to receive cool process stream along a conduit independent from, and parallel to, a conduit for another of the plurality of heat exchanger paths, wherein the cool process stream inlet comprises a cool process stream inlet common to each conduit;
a cool process stream flow control valve operatively coupled to each of the plurality of conduits, wherein each cool process stream flow control valve controls a cool process stream flow rate through the respective heat exchanger path;
a hot process stream flow control valve operatively coupled to each heat exchanger path, wherein each hot process stream flow control valve controls a hot process stream flow rate through the respective heat exchanger path;
a temperature sensing device operatively coupled to an outlet of each heat exchanger path, wherein the temperature sensing device measures the temperature of cool process stream passed through the heat exchanger path; and
a controller operatively coupled to each temperature sensing device, each cool process stream flow control valve and each hot process stream flow control valve, wherein the controller adjusts each cool process stream flow control valve and each hot process stream flow control valve to equalize the temperature of cool process stream passed through the plurality of heat exchanger paths.

18. The multiple parallel path heat exchanger system of claim 17, wherein the controller is configured to:
- collect on-line process data related to the cool process stream outlet temperatures of the plurality of heat exchanger paths,
- develop a set of stream flow rate target values based on the on-line process data, wherein the stream flow rate target values comprise intended flow rates of the hot process stream and cool process stream through each heat exchanger to equalize each of the cool process stream outlet temperatures; and
- adjust each cool process stream flow control valve and each hot process stream flow control valve based on the set of stream flow rate target values to equalize the temperature of cool process stream passed through the plurality of heat exchanger paths.

19. The multiple parallel path heat exchanger system of claim 18, wherein the stream flow rate target value is a function of one or more of the group consisting of the cool process stream flow rate and the hot process stream flow rate, a cool process stream inlet temperature, the cool process stream outlet temperature, a hot process stream inlet temperature, and a hot process stream outlet temperature.

20. A computer-readable medium having computer-executable instructions stored on a computer-readable storage medium for optimizing heat recovery in a multiple parallel path heat exchanger system of a process control system, the computer executable instructions comprising instructions for:
- collecting on-line process data from a plurality of heat exchangers during operation of the heat exchangers, wherein the plurality of heat exchangers comprise a network of heat exchangers having multiple parallel paths and wherein the on-line process data is generated from cool process stream outlet temperatures of the multiple parallel paths, each outlet temperature pertaining to the temperature of cool process stream passed through one or more heat exchangers in the respective path;
- developing a set of stream flow rate target values based on the on-line process data, wherein the stream flow rate target values comprise intended flow rates of a hot process stream and cool process stream through each heat exchanger to equalize each of the cool process stream outlet temperatures; and
- controlling at least one of one or more cool stream flow control valves of the heat exchanger network and one or more hot process stream flow control valves of the heat exchanger network based on the set of stream flow rate target values to effect equalization of the cool process stream outlet temperatures.

21. The computer-readable medium having computer-executable instructions of claim 20, wherein the instructions for collecting on-line process data from a plurality of heat exchangers comprises computer executable instructions for collecting measurements of differential cool process stream outlet temperatures.

22. The computer-readable medium having computer-executable instructions of claim 20, wherein the instructions for developing a set of stream flow rate target values comprises computer executable instructions for:
- determining a difference in temperature between each of the outlet temperatures based on the on-line process data; and
- developing the set of stream flow rate target values based on the difference in temperature.

23. The computer-readable medium having computer-executable instructions of claim 20, wherein the instructions for developing a set of stream flow rate target values comprise computer executable instructions for developing a set of stream flow rate target values as a function of one or more of the group consisting of the cool process stream flow rate and the hot process stream flow rate, a cool process stream inlet temperature, the cool process stream outlet temperature, a hot process stream inlet temperature, and a hot process stream outlet temperature.

24. The computer-readable medium having computer-executable instructions of claim 20, wherein the instructions for controlling at least one of one or more cool stream flow control valves of the heat exchanger network and one or more hot process stream flow control valves of the heat exchanger network comprise computer executable instructions for incrementally adjusting one or more flow control valves of each heat exchanger to effect the process stream flow rate target value for the heat exchanger without controller-induced oscillations.

* * * * *